(12) United States Patent
Krause et al.

(10) Patent No.: US 11,393,638 B2
(45) Date of Patent: Jul. 19, 2022

(54) TI—ZR ALLOY POWDER AND ANODE CONTAINING THE SAME

(71) Applicant: Global Advanced Metals USA, Inc., Wellesley Hills, MA (US)

(72) Inventors: Mary Krause, Phoenixville, PA (US); Aamir Abid, Spring City, PA (US); Aijun Yin, Schwenksville, PA (US); Lei Wang, Berwyn, PA (US); Craig Sungail, Chadds Ford, PA (US); Geoffrey Smith, Fleetwood, PA (US)

(73) Assignee: GLOBAL ADVANCED METALS USA, INC., Wellesley Hills, MA (US)

( * ) Notice: Subject to any disclaimer, the term of this patent is extended or adjusted under 35 U.S.C. 154(b) by 0 days.

(21) Appl. No.: 16/845,106

(22) Filed: Apr. 10, 2020

(65) Prior Publication Data

US 2020/0343052 A1     Oct. 29, 2020

Related U.S. Application Data

(60) Provisional application No. 62/839,807, filed on Apr. 29, 2019.

(51) Int. Cl.
*H01G 9/052* (2006.01)
*C22C 16/00* (2006.01)
(Continued)

(52) U.S. Cl.
CPC ........... *H01G 9/0525* (2013.01); *B22F 1/054* (2022.01); *B22F 1/17* (2022.01); *B22F 9/30* (2013.01);
(Continued)

(58) Field of Classification Search
CPC .... B22F 1/0007; B22F 1/0011; B22F 1/0014; B22F 1/0018; B22F 1/0044; B22F 1/0048; B22F 1/02; B22F 2301/205; B22F 2302/25; B22F 2302/35; B22F 2302/45; B22F 2303/15; B22F 2304/00; B22F 2304/05; B22F 2304/052; B22F 2304/054; B22F 2304/056; B22F 2304/058; B22F 2304/10; B22F 2304/15; C22C 1/0458;
(Continued)

(56) References Cited

U.S. PATENT DOCUMENTS 3,093,883 A * 6/1963 Haring ..................... H01G 4/30
                                                      29/25.42
3,599,053 A     8/1971 Iida et al.
(Continued)

FOREIGN PATENT DOCUMENTS

EP           0367068 A2     5/1990
WO    WO-2017070779 A1 *    5/2017 ............... B22F 9/04

OTHER PUBLICATIONS

International Search Report and Written Opinion issued in corresponding International Patent Application No. PCT/US2020/027566 dated Jun. 17, 2020 (24 pages).
(Continued)

*Primary Examiner* — Vanessa T. Luk
(74) *Attorney, Agent, or Firm* — Kilyk & Bowersox, P.L.L.C.

(57) ABSTRACT

A Ti—Zr alloy in powder form is described. Sintered pellets containing the Ti—Zr alloy powder of the present invention, as well as capacitor anodes, are further described.

28 Claims, 5 Drawing Sheets

10.0μm

(51) Int. Cl.
  *H01G 9/042* (2006.01)
  *B22F 9/30* (2006.01)
  *H01G 9/00* (2006.01)
  *B22F 1/17* (2022.01)
  *B22F 1/054* (2022.01)
  *H01G 9/15* (2006.01)
  *H01G 9/04* (2006.01)

(52) U.S. Cl.
  CPC ............ *C22C 16/00* (2013.01); *H01G 9/0029* (2013.01); *H01G 9/042* (2013.01); *B22F 2301/205* (2013.01); *B22F 2304/054* (2013.01); *H01G 9/15* (2013.01); *H01G 2009/05* (2013.01)

(58) Field of Classification Search
  CPC ....... C22C 1/0491; C22C 14/00; C22C 16/00; H01G 4/008; H01G 4/0085; H01G 5/011; H01G 5/012; H01G 9/04; H01G 9/042; H01G 9/0425; H01G 9/048; H01G 9/052; H01G 9/0525; H01G 9/0029; H01G 9/15; H01G 2009/05; H01G 11/22; H01G 11/24; H01G 11/30
  See application file for complete search history.

(56) References Cited

U.S. PATENT DOCUMENTS

| | | | | |
|---|---|---|---|---|
| 3,649,880 | A | | 3/1972 | Nakata et al. |
| 4,470,847 | A | * | 9/1984 | Hard .................. B22F 9/02 419/30 |
| 4,957,541 | A | * | 9/1990 | Tripp .................. B22F 9/24 361/529 |
| 5,498,446 | A | | 3/1996 | Axelbaum et al. |
| 7,442,227 | B2 | | 10/2008 | Rosen et al. |
| 2003/0169560 | A1 | | 9/2003 | Welsch et al. |
| 2006/0269436 | A1 | * | 11/2006 | Yuan .................... H01G 9/0525 419/31 |
| 2007/0180950 | A1 | * | 8/2007 | Thon .................... H01G 9/0525 75/245 |
| 2008/0254293 | A1 | * | 10/2008 | Loffelholz ................ C22B 5/00 428/402 |
| 2010/0068510 | A1 | * | 3/2010 | Stenzel .................. H01G 9/052 428/336 |
| 2015/0299887 | A1 | | 10/2015 | Murayama et al. |
| 2016/0064150 | A1 | * | 3/2016 | Haas ...................... C22C 1/045 419/27 |
| 2016/0111221 | A1 | | 4/2016 | Murayama et al. |
| 2019/0001416 | A1 | * | 1/2019 | Larouche ................ B22F 9/14 |

OTHER PUBLICATIONS

Kikuchi et al., "Fabrication of a micro-porous Ti—Zr alloy by electroless reduction with a calcium reductant for alectrolytic capacitor applications," Journal of Alloys and Compounds, 2014, vol. 586, pp. 148-154.

Lee et al., "Study on synthesis of Zr—Ti alloy powder using molten magnesium," Materials Research Innovations, 2013, vol. 17, pp. 113-117.

Prando et al., "Corrosion of titanium: Part 2: Effects of surface treatments," Journal of Applied Biomaterials & Functional Materials, 2018, vol. 16(1), pp. 3-13.

Xu et al., "Comparison of sizing small particles using different technologies," Powder Technology, 2003, vol. 132, pp. 145-153.

Grandin et al., "A Review of Titanium Zirconium (TiZr) Alloys for Use in Endosseous Dental Implants," MDPI, Aug. 2012, 5(8), 1348-1360.

* cited by examiner

TI—ZR ALLOY POWDER AND ANODE CONTAINING THE SAME

BACKGROUND OF THE INVENTION

This application claims the benefit under 35 U.S.C. § 119(e) of prior U.S. Provisional Patent Application No. 62/839,807 filed Apr. 29, 2019, which is incorporated in its entirety by reference herein.

The present invention relates to titanium-zirconium (Ti—Zr) alloy powders and the use of these alloy powders to form sintered pellets and capacitor anodes and the like. Methods of making the same are further described.

While tantalum and, at times, niobium have been readily used in powder form to form sintered pellets and ultimately capacitor anodes, there is a desire to use alternative materials for a variety of reasons, including cost. Another reason is to work with materials that have a higher dielectric constant compared to tantalum oxide, which allows for a higher theoretical CV/g with a comparable CV/cc. Also, a metal like titanium oxide can have high leakage, but, as shown in the present invention, a zirconium titanium alloy can have lower leakage compared to titanium.

As described in U.S. Pat. No. 3,599,053, pure titanium has been considered for possible use as a capacitor electrode material in view of the high dielectric constant of its oxide and other good properties such as corrosion resistance and low density. However, it has been difficult to make a dielectric oxide film on the surface of titanium superior in leakage current at high voltages. Such a drawback of titanium prevents its wide use as an electrode adapted to an electrolytic capacitor in spite of its high dielectric constant and good sinterability. Also a porous body of titanium can be inferior with respect to leakage current when formed into a solid electrolytic capacitor.

U.S. Pat. No. 3,649,880 describes a mixture of titanium powder with zirconium powder used for anodes, but the material identified as an alloy in this patent is a powder metallurgy type product that is a mixture of sintered powders and is not particles or material having a Ti—Zr phase, which is generally a solid solution of titanium and zirconium.

Thus, there is a need to develop true alloys of titanium and zirconium and provide products made from the same that overcome one or more of the problems/disadvantages described above.

SUMMARY OF THE PRESENT INVENTION

A feature of the present invention is to provide a titanium-zirconium alloy that is in powder or particulate form and is a solid solution of titanium and zirconium.

An additional feature of the present invention is to provide a titanium-zirconium alloy in powder or particulate form that can be utilized in the formation of sintered pellets.

Also, a feature of the present invention is to provide a titanium-zirconium alloy having a dendritic structure or having a nodular shape.

A further feature of the present invention is to provide a titanium-zirconium alloy powder that is useful in forming anodes for capacitors.

To achieve these and other advantages and in accordance with the purposes of the present invention, as embodied and broadly described herein, the present invention provides a Ti—Zr alloy in powder form. The Ti—Zr alloy powder can have a dendritic structure and/or can have a nodular shape. The Ti—Zr alloy powder can be in the substantial absence of other elements (other than Ti and Zr). The Ti—Zr alloy powder can have one or more beneficial properties that permit the powder to be useful in forming sintered pellets and ultimately anodes and therefore provide one or more suitable capacitor properties such as electrical leakage control and/or other properties associated with anodes.

The present invention further relates to a titanium-zirconium (Ti—Zr) alloy powder that has an atomic ratio of Ti and Zr of from 10:90 to 90:10. The Ti—Zr alloy powder can have an average primary particle size of from 500 nm to 2 microns. The Ti—Zr alloy powder can further include a Ti—Zr oxide layer on the Ti—Zr alloy powder. The Ti—Zr alloy powder can further include phosphorus. Further options and details of the Ti—Zr alloy powder are provided herein.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 1B is at a higher magnification.

DETAILED DESCRIPTION OF THE PRESENT INVENTION

The present invention relates to Ti—Zr alloy powders. The Ti—Zr alloy powder is not a mere physical mixture of titanium with zirconium, nor is the Ti—Zr alloy powder of the present invention considered a mechanical mixing of the two elements. Instead, the Ti—Zr alloy powder of the present invention is a powder comprising a plurality of particles with each particle or nearly every particle having at least a Ti—Zr phase, which is generally a solid solution of titanium and zirconium.

Figure 1A:
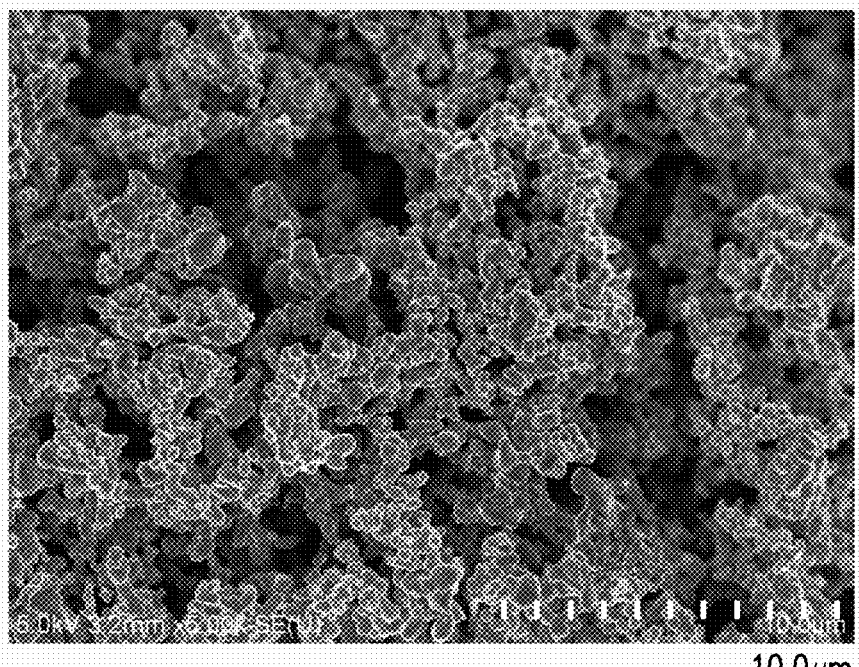
FIG. 1A and FIG. 1B are SEM photographs of one example of the Ti—Zr alloy powder of the present invention, where
Figure 1B:
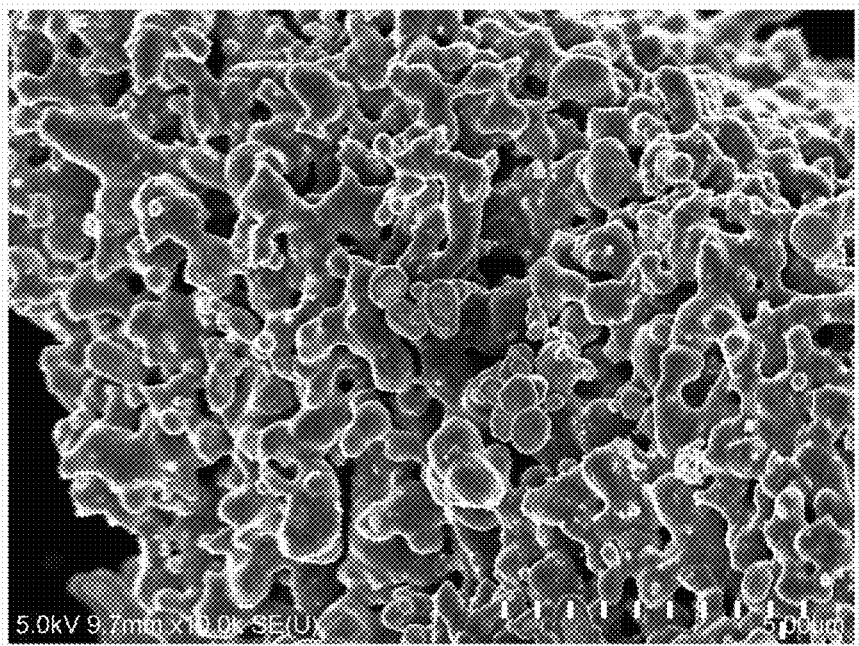

The Ti—Zr alloy powders can have a dendritic structure. The Ti—Zr alloy powders can have a nodular shape. The Ti—Zr alloy powders can have both a dendritic structure and a nodular shape. For purposes of the present invention, it is understood that a dendritic shape or form is a particle having branching structures and/or erratic winding travels of individual branches. The term is understood in the art and reference is made, for instance, to "Modeling Dendritic Shapes Using Path Planning" by Lingxhu et al. Further, FIG. 1A and FIG. 1B show examples of dendritic shapes and forms.

The Ti—Zr alloy powder can have an atomic ratio of Ti and Zr of from about 10:90 to about 90:10, such as, but not limited to, an atomic ratio of Ti and Zr of 20:80 to 80:20, or 30:70 to 70:30, or 40:60 to 60:40. As a further example, the Ti—Zr alloy powder can have 50 at % Zr, or from about 20 at % to about 40 at % Zr, or from about 30 at % to about 40 at % Zr. As a further example, the Ti—Zr alloy powder can have 50 at % Ti, or from about 20 at % to about 40 at % Ti, or from about 30 at % to about 40 at % Ti.

As an option, the Ti—Zr alloy powder has a primary Ti—Zr phase that is at least 60 at %, or that is at least 70 at %, or at least 80 at %, or at least 90 at % or at least 95 at % or at least 99 at %. For instance, the Ti—Zr alloy powder can have a primary Ti—Zr phase of from about 10 at % to 99.99 at %, or from about 10 at % to 95 at %, or from about 10 at % to 90 at %, and the like.

The Ti—Zr alloy powder can be particles consisting of a single phase homogeneous solid solution of Ti and Zr.

As an option, the titanium-zirconium alloy powder can be considered a binary Ti—Zr alloy powder.

The Ti—Zr alloy powder can have less than 500 ppm of individual grains of titanium or zirconium or both, such as less than 400 ppm, less than 300 ppm, less than 200 ppm, less than 100 ppm, less than 50 ppm, less than 25 ppm, less than 10 ppm, less than 5 ppm, or less than 1 ppm of individual grains of titanium or zirconium or both.

The Ti—Zr alloy powder of the present invention can be a powder that is in the substantial absence of elements other than Ti and Zr. For instance, the non-gaseous elements (e.g., non-gaseous elements in general or non-gaseous metallic elements) present in the Ti—Zr alloy powder, other than Ti and Zr, can be present in an amount of less than 1 wt %, such as from about 0.1 ppm to about 500 ppm, or from about 1 ppm to 250 ppm, or from about 1 ppm to 100 ppm, or from about 1 ppm to 50 ppm, or less than 50 ppm, or less than 25 ppm, or less than 500 ppm, based on the weight of the alloy powder.

The Ti—Zr alloy powder can have less than 50 ppm elemental carbon, such as less than 40 ppm carbon, less than 30 ppm carbon, less than 20 ppm carbon, less than 10 ppm carbon, less than 5 ppm carbon, less than 1 ppm carbon, such as 0 ppm to 49 ppm or 0.1 ppm to 20 ppm or 0.1 ppm to 2 ppm.

As an option, the titanium-zirconium alloy powder can have an oxygen content of from about 0.1 wt % to about 5 wt % (e.g., from about 0.1 wt % to about 4 wt %, from about 0.1 wt % to about 3 wt %, from about 0.1 wt % to about 2 wt %, from about 0.1 wt % to about 1 wt %, from about 0.2 wt % to about 5 wt %, from about 0.3 wt % to about 5 wt %, from about 0.5 wt % to about 5 wt %, from about 1 wt % to about 5 wt %), based on the weight of the powder.

As an option, the titanium-zirconium alloy powder can have a nitrogen content of from about 0.01 wt % to about 20 wt % (e.g., from about 0.01 wt % to about 15 wt %, from about 0.01 wt % to about 10 wt %, from about 0.01 wt % to about 5 wt %, from about 0.01 wt % to about 1 wt %, from about 0.05 wt % to about 20 wt %, from about 0.1 wt % to about 20 wt %, from about 0.5 wt % to about 20 wt %, from about 1 wt % to about 20 wt %), based on the weight of the powder.

As an option, the titanium-zirconium alloy powder can have a phosphorous content of from about 0.001 wt % to about 5 wt % (e.g., from about 0.1 wt % to about 4 wt %, from about 0.1 wt % to about 3 wt %, from about 0.1 wt % to about 2 wt %, from about 0.1 wt % to about 1 wt %, from about 0.2 wt % to about 5 wt %, from about 0.3 wt % to about 5 wt %, from about 0.5 wt % to about 5 wt %, from about 1 wt % to about 5 wt %), based on the weight of the powder.

As an option, the titanium-zirconium alloy powder can have a hydrogen content of from about 0.001 wt % to about 5 wt % (e.g., from about 0.1 wt % to about 4 wt %, from about 0.1 wt % to about 3 wt %, from about 0.1 wt % to about 2 wt %, from about 0.1 wt % to about 1 wt %, from about 0.2 wt % to about 5 wt %, from about 0.3 wt % to about 5 wt %, from about 0.5 wt % to about 5 wt %, from about 1 wt % to about 5 wt %), based on the weight of the powder.

The use of a gas such as nitrogen, phosphorous, and/or hydrogen can further serve as a passivating agent to further stabilize the Ti—Zr alloy powder.

As an option, the titanium-zirconium alloy powder (excluding the optional oxide layer) can consist of less than 500 ppm of elements other than Ti, Zr, O, and P, such as less than 100 ppm of elements other than Ti, Zr, O, and P (e.g., 0 ppm to 99 ppm, 1 ppm to 75 ppm, 1 ppm to 50 ppm, 1 ppm to 25 ppm, 1 ppm to 10 ppm, less than 5 ppm). The titanium-zirconium alloy powder (excluding the optional oxide layer) can consist of less than 500 ppm of elements other than Ti, Zr, O, N, H, and P, such as less than 100 ppm of elements other than Ti, Zr, O, N, H, and P. These ppm limits as set forth herein can apply to one element or more than one element or all of the stated elements.

As an option, the Ti—Zr alloy powder can further include a Ti—Zr oxide layer on the titanium-zirconium alloy powder.

The Ti—Zr oxide layer can have a thickness of from about 1 nm to about 20 nm or thicker, such as from about 5 nm to about 20 nm or from about 10 nm to about 20 nm.

As an option, the Ti—Zr oxide layer, if present, can partially encapsulate or fully encapsulate the titanium-zirconium alloy powder. For instance, over 95 vol % or over 99 vol % or over 99.9 vol % or 100 vol % of the Ti—Zr powder can have an oxide layer on the surface that encapsulates over 50%, over 60%, over 70%, over 80%, over 90%, over 95%, over 99%, or 100% of the available external surface area of the Ti—Zr powder.

As an option, the Ti—Zr oxide layer can further include phosphorus. If present, the phosphorus can be present at a level of from about 1 ppm to 5,000 ppm or from about 50 ppm to about 5,000 ppm, such as from about 100 ppm to 4,000 ppm, or from about 200 ppm to about 5,000 ppm, or from about 100 ppm to 3,000 ppm or from about 100 ppm to 2,000 ppm, or from about 100 ppm to 1,000 ppm or from about 100 ppm to 500 ppm.

With respect to particle sizes and distributions, the Ti—Zr can have a variety of particle sizes and/or distributions.

The Ti—Zr alloy powder of the present invention can have an average primary particle size of from about 500 nm to about 2 microns or sizes below this range or above this range. Examples of sizes include, but are not limited to, from about 600 nm to 2 microns, 600 nm to 1.5 microns, 600 nm to 1 micron, and the like.

For instance, the titanium-zirconium alloy powder can have a D10 and D90 that is within 35% of the D50. The titanium-zirconium alloy powder can have a D10 and D90 that is within 25% of the D50.

The titanium-zirconium alloy powder can have a D10 of from about 0.3 micron to about 10 microns (e.g., from about 0.5 micron to about 7 microns or from about 1 micron to about 5 microns, or from about 2 microns to about 8 microns), and/or a D50 of from about 0.5 micron to about 400 microns (e.g., from about 0.5 micron to about 300 microns, from about 0.5 micron to about 200 microns, from about 0.5 micron to about 100 micron, from about 0.5 micron to about 50 microns, from about 1 micron to about 400 microns, from about 5 microns to about 400 microns, from about 10 microns to about 400 microns, from about 20 microns to about 400 microns, from about 50 microns to about 400 microns, from about 100 microns to about 400 microns), and/or a D90 of from about 1 micron to about 700 microns (e.g., from about 1 micron to about 600 microns, from about 1 micron to about 500 microns, from about 1 micron to about 400 microns, from about 1 micron to about 300 microns, from about 1 micron to about 200 microns, from about 1 micron to about 200 microns, from about 1 micron to about 100 microns, from about 5 microns to about 700 microns, from about 10 microns to about 700 microns, from about 20 microns to about 700 microns, from about 40 microns to about 700 microns, from about 50 microns to about 700 microns, from about 75 microns to about 700 microns, from about 100 microns to about 700 microns).

The titanium-zirconium alloy powder can have a BET surface area of from about 0.1 m$^2$/g to about 20 m$^2$/g or higher, such as from about 0.5 m$^2$/g to about 20 m$^2$/g, from about 1 m$^2$/g to about 20 m$^2$/g, from about 3 m$^2$/g to about 20 m$^2$/g, from about 5 m$^2$/g to about 20 m$^2$/g, from about 0.1 m$^2$/g to about 15 m$^2$/g, from about 0.1 m$^2$/g to about 10 m$^2$/g, from about 0.1 m$^2$/g to about 5 m$^2$/g, or from about 0.3 m$^2$/g to about 2 m$^2$/g.

As a further example, a Ti—Zr alloy powder can have a BET of 5 m$^2$/g or less with an average particle size of about 400 nm to 600 nm, or 500 nm to 600 nm.

As an option, the titanium-zirconium alloy powder can be considered a non-oxide metal powder (excluding any oxide layer that may be present). Put another way, the Ti—Zr powder does not comprise an oxide as part of the alloy itself, as an option.

The Ti—Zr alloy powder of the present invention can have a fractal dimension of from about 1.9 to about 3, such as from about 2 to about 3, or from about 2.0 to 2.95 or from about 2.2 to 2.8 or from about 2 to about 2.2. The fractal dimension can be calculated, for instance, using the Hausdorff method or the Minkowski-Bouligand method or can be determined using the modified box counting method and numerical calibration curves provided by Wozniak et. al in the Journal of Aerosol Science, ISSN: 0021-8502, Vol: 47, Page: 12-26) (incorporated in its entirety by reference herein).

The Ti—Zr alloy powders of the present invention can have one or more of the following parameters, wherein any combination of these parameters can be present in the Ti—Zr alloy powders.

Average Particle Size: from 500 nm to 2 microns
Mesh Size (US): from −400 to −40
Scott density: from about 6 g/in$^3$ to about 30 (e.g. 6 g/in$^3$ to 13 g/in).

The Ti—Zr alloy powders of the present invention, as indicated above, can have a purity (with respect to Ti—Zr) of at least 99% by weight, such as at least 99.5 wt %, at least 99.9 wt %, at least 99.99 wt %, at least 99.995 wt %, and the like, wherein the weight percent is a reference to the alloy powder by weight (and excludes any oxide layer or other layer that may be present).

The Ti—Zr alloy powders of the present invention can be porous or have porosity.

The Ti—Zr alloy powders of the present invention can be non-agglomerated or agglomerated. If agglomerated, the agglomerate sizes can be from about 10 to about 500,000 primary particles.

As an option, the Ti—Zr alloy powders can be doped with one or more dopants, such as nitrogen, phosphorous, carbon, boron, and/or hydrogen or any combinations thereof. The amount of dopant that can be present in the Ti—Zr alloy powders of the present invention can be any suitable amount, such as from about 10 ppm to 1,000 ppm, such as from about 50 ppm to 1,000 ppm, from about 100 ppm to 1,000 ppm, from about 200 ppm to 1,000 ppm, from about 350 ppm to 1,000 ppm or more. The dopants can be present as a solid solution or can be present as compounds with the metal elements or other dopants including oxygen.

The Ti—Zr alloy powder of the present invention can be formed into a sintered pellet and can be used to form an anode and ultimately be present as part of a capacitor. The capacitor or anode within the capacitor can be wet or dry.

In the present invention, the sintered pellet can comprise, consist essentially of, consist of, or include the Ti—Zr alloy powders of the present invention, wherein the Ti—Zr alloy powder is pressed and sintered. For instance, the Ti—Zr alloy powder can be pressed into any size or shape, for instance, a cylindrical shape, square shape, or other geometrical shape, and preferably is a shape suitable for purposes of an anode. The Ti—Zr powder of the present invention can be pressed, for instance, to form a green body, and this pressing can occur at a press density of from about 1.2 to about 3.0 g/cm$^3$. The sintering to form the sintered pellet can occur at a temperature of from about 400° C. to about 1200° C. The sintered times can be any suitable time to form a sintered pellet, for instance, for a time of from about 1 minute to 60 minutes, or more.

As an option, the sintered pellet can further comprise a wire lead embedded at least partially into the sintered pellet. This wire lead can be a metal wire lead, such as one with a Ti—Zr alloy material, or titanium by itself, or zirconium itself, or tantalum, or niobium or other electrically conductive material, such as aluminum and the like.

As indicated, the present invention further relates to a capacitor anode that comprises at least one sintered pellet of the present invention. As indicated, the pellet can have any shape or dimensions. The capacitor anode of the present invention can have a capacitance of at least 1,000 μFV/g. For instance, the capacitance can be at least 5,000 μFV/g, at least 10,000 μFV/g, for instance, from about 1,000 μFV/g to about 50,000 μFV/g, from about 10,000 μFV/g to about 100,000 μFV/g, from about 50,000 μFV/g to about 150,000 μFV/g, or from about 1,000 μFV/g to about 260,000 μFV/g or more.

The capacitor anode of the present invention can have a DC leakage of less than 15 nA/μFV, such as less than 10 nA/μFV, or less than 5 nA/μFV, such as from about 0.1 nA/μFV to 5 nA/μFV, or 0.1 nA/μFV to 10 nA/μFV.

With the present invention, the sintered pellet or capacitor anode, when anodized, forms an anodic oxide film on the anode surface. With the present invention, this anodic film comprises, consists essentially of, or consists of one or more oxides. The one or more oxides may or may not be amorphous, or amorphous only. With the present invention, oxide crystals, as an option, can be significantly avoided, be non-existent, or be of such an insignificant level that it does not affect the overall performance of the capacitor anode. For instance, the oxide crystals, if any, would be less than 5% by volume, or less than 1% by volume based on total volume of the anodic film.

The anodic film can be or include or be part of a passivation layer or be considered a passivation layer. The thickness of this film can be from about 5 nm to about 600 nm or from about 20 nm to about 600 nm in thickness or thicker.

The anode of the present invention can have a cumulative porosity of from about 0.1 mL/g to about 0.6 mL/g, such as from about 0.1 mL/g to about 0.5 mL/g or from about 0.2 mL/g to about 0.4 mL/g.

The present invention further relates to a method of forming a capacitor anode that comprises the Ti—Zr alloy powder of the present invention. The method includes forming the Ti—Zr alloy powder into the shape of an anode and sintering at a suitable sintering temperature, such as from about 400° C. to about 1,200° C. for a time, for instance, from about 1 minute to about 30 minutes or more. Then, as an option, the anodizing of the sintered material can occur, for instance, at an anodizing voltage of from about 10 volts to about 200 volts or from about 10 volts to about 75 volts or more at a formation temperature of from about 10° C. to about 80° C. Other formation voltages can be used and/or other formation temperatures can be used. Then, the anode can be annealed, for instance, at a temperature of from about 300° C. to about 350° C. for a time of from about 10 minutes to about 60 minutes or more. As an option, the anode can then be subjected to manganizing, for instance at a temperature of from 220° C. to about 280° C. or other temperatures.

In forming the anode, the Ti—Zr alloy powder can be mixed with at least one binder and/or at least one lubricant to form the pressed anode. Thus, the pressed anode can comprise, consist essentially of, or consist of a pressed Ti—Zr alloy powder of the present invention with at least one binder and/or at least one lubricant.

Figure 3:
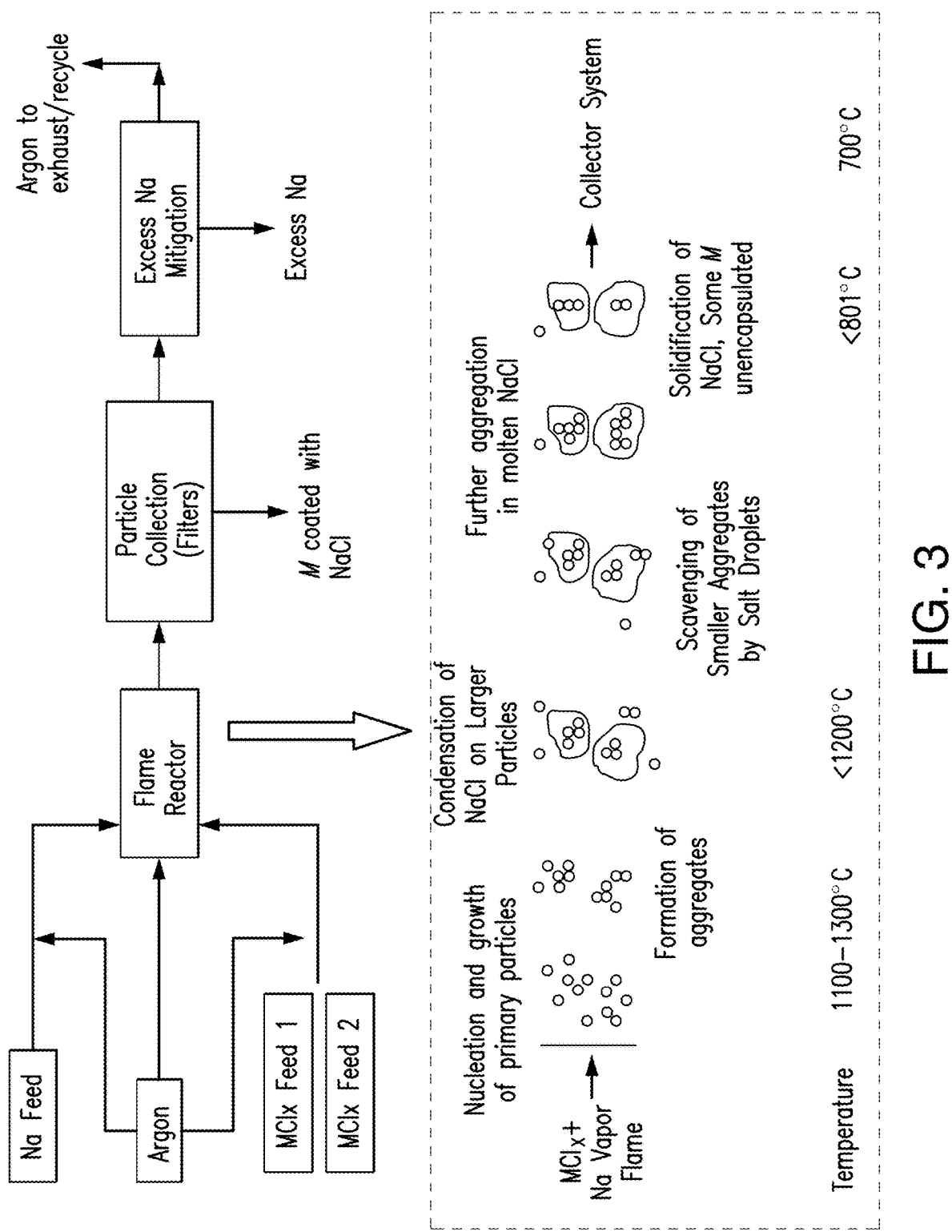
FIG. 3 is a schematic diagram showing an embodiment of the various steps leading to the formation of the Ti—Zr alloy powder of the present invention.

In forming the Ti—Zr alloy powders of the present invention, a flamed particle formation process is preferably used, for instance, one that is similar to the processes described in U.S. Pat. Nos. 7,442,227 and 5,498,446, incorporated in their entirety by reference herein. More specifically, an alkali metal feed, preferably a sodium feed, is injected into a flame reactor and a separate feed of a halide containing the titanium and a halide containing the zirconium are introduced as a feed or feeds into a flame reactor as well. The halide that contains the Ti can be $TiCl_4$, and the halide that contains the Zr can be $ZrCl_4$. These three feeds are then introduced (e.g., injected) into the flame reactor. The feeds that contain the titanium halide and the zirconium halide can be combined prior to their entry into the flame reactor or introduced separately into the flame reactor. The introduction of the feeds can be generally under an inert gas environment, such as argon. In the flame reactor, the various feeds, as an option, can be converted to a vapor or the feeds can be fed into the reactor as a vapor. The titanium and zirconium halides react with the alkali metal to form the Ti—Zr alloy powders which typically are in the presence of a halide, such as sodium chloride. As shown, for instance, in FIG. 3, primary particles are nucleated and grown and ultimately aggregates of these particles can be formed and can be encapsulated within a salt, such as sodium chloride, and eventually solidified such that the Ti—Zr alloy powders are encapsulated by the salt, e.g., sodium chloride. Excess sodium is then removed through various techniques, and the Ti—Zr alloy particles coated with the salt, such as sodium chloride, are generally collected through a particle collection or filters which can be under an inert gas or other non-reactive environment. As an option, further heat treatment in an inert gas or vacuum environment can be used and this can increase the primary particle size. Ultimately, the sodium chloride can be removed (e.g., washed away or dissolved away, or sublimed) and the Ti—Zr alloy powder is recovered.

Figure 2:
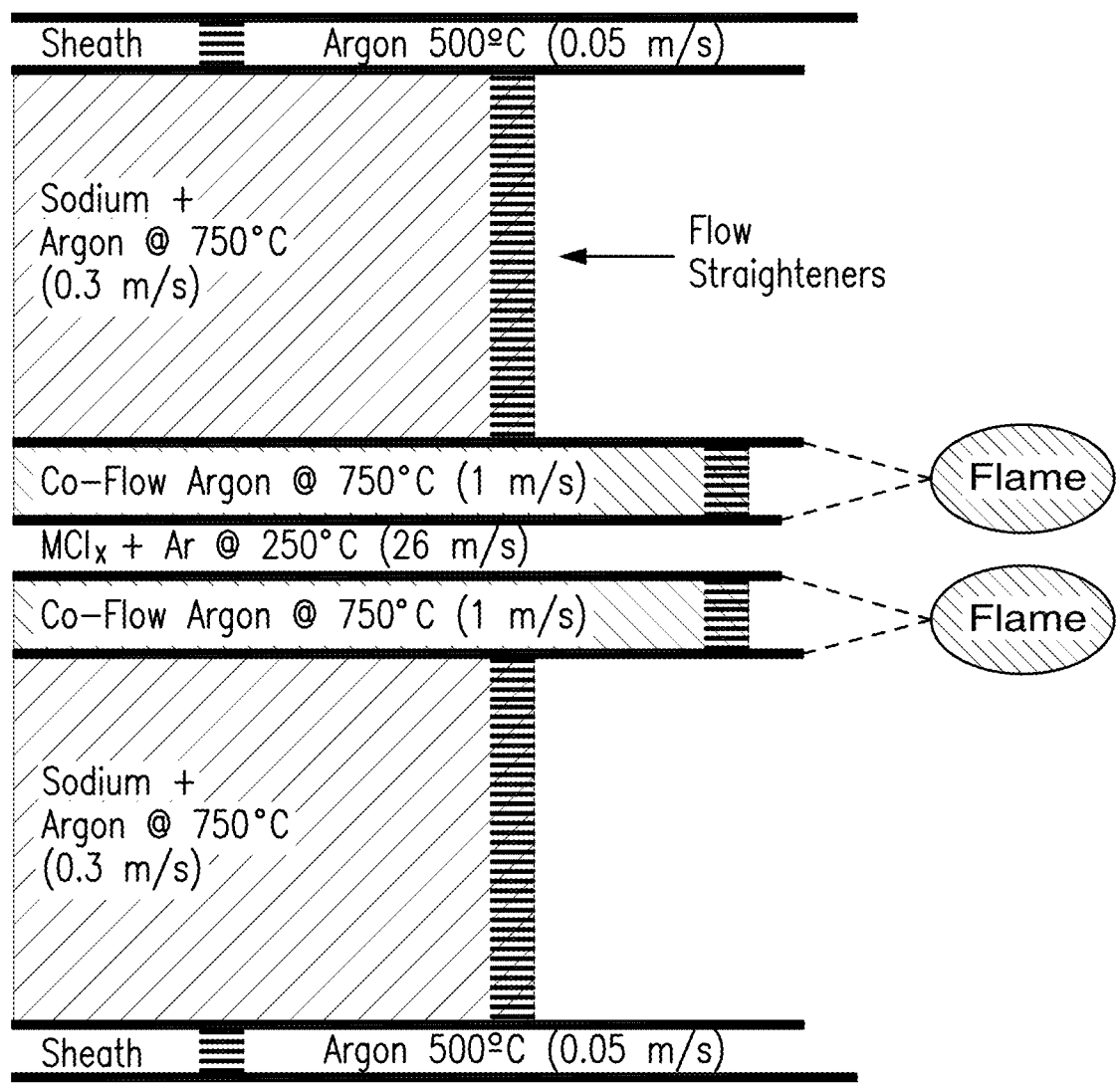
FIG. 2 is a diagram showing an exemplary part of the process to form the Ti—Zr alloy powders of the present invention.

FIG. 2 shows one preferred method of the introduction of the reactants into the flame reactor. As can be seen in FIG. 2, flow straighteners can be used to maintain the feeds in a proper direction and alignment and, preferably, the reactants are sheathed in an inert environment, as shown in FIG. 2.

Figure 4A:
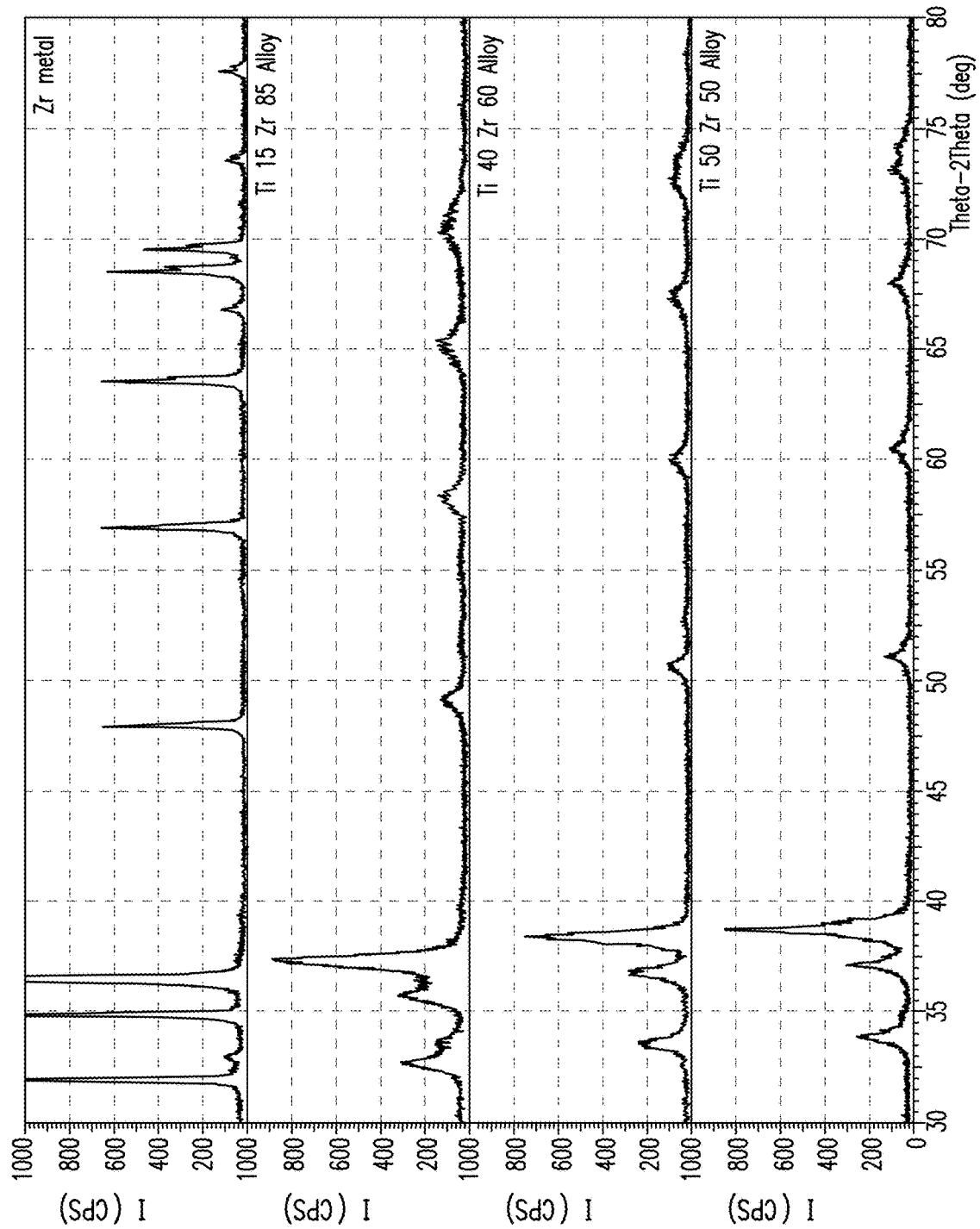
FIG. 4A and FIG. 4B are an XRD analysis showing a) pure zirconium, b) Ti-15 at % Zr-85 at %, c) Ti-40 at %, Zr-60 at %, d) Ti-50 at %, Zr-50 at % from examples of the present invention.
Figure 4B:
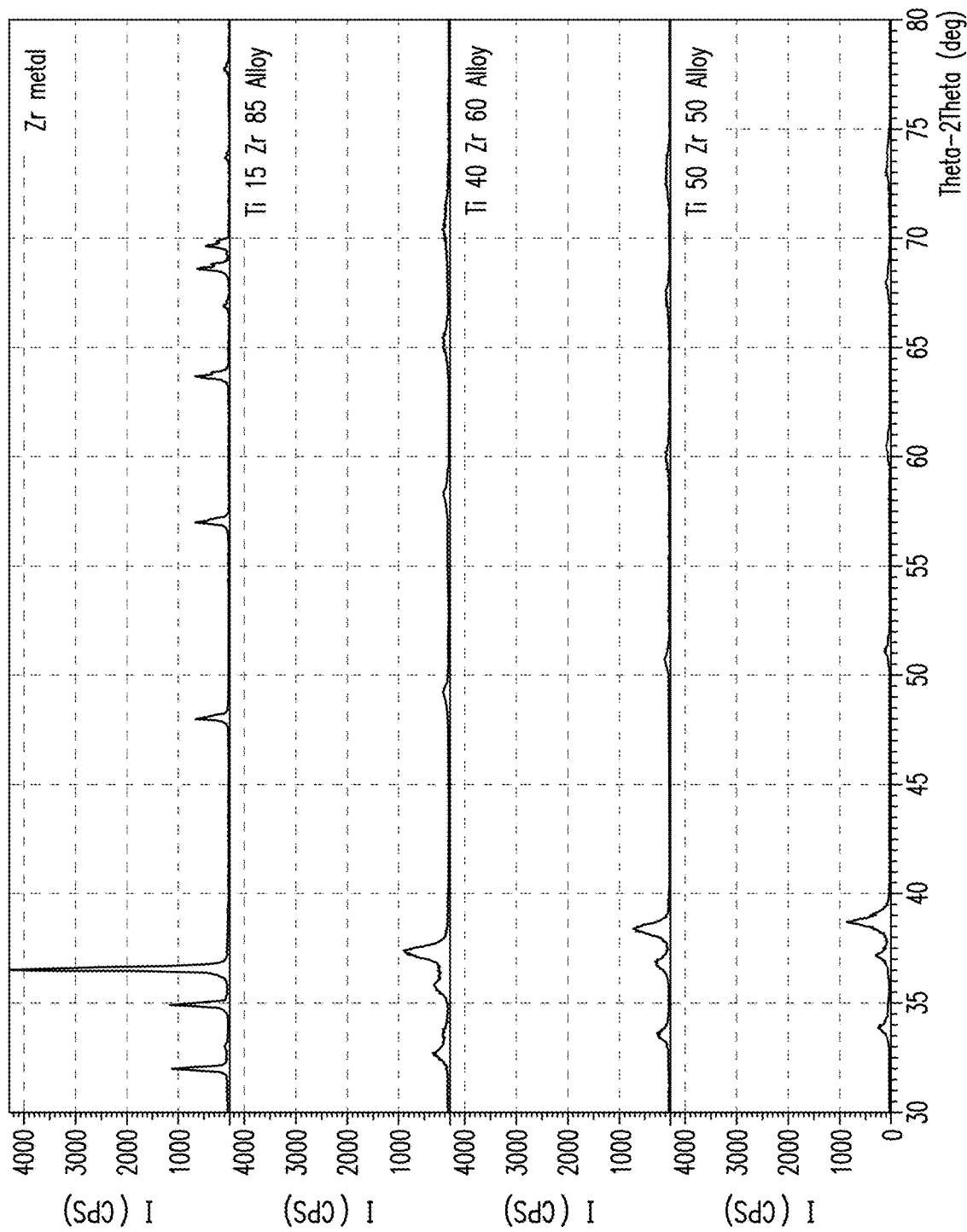

The XRD of examples of Ti—Zr alloys of the present invention are shown in FIGS. 4A and 4B and compared to pure zirconium.

The present invention will be further clarified by the following examples, which are intended to be exemplary of the present invention.

EXAMPLES

Example 1

A salt-encapsulated alloy powder having a mass ratio of Ti to Zr of 27:63 was manufactured by the flame synthesis process as described in U.S. Pat. No. 7,442,227 and in a manner shown in FIG. 2. Vaporous titanium chloride and zirconium chloride (halides) were introduced with argon into a reactor through a central tube at mass ratio of 0.67 $TiCl_4$ to $ZrCl_4$. A concentric Ar flow was positioned between the halides and the vaporous sodium flow which was provided in excess. As described in U.S. Pat. No. 7,442,227, the sodium chloride byproduct acted as a condensable vaporous material to arrest the sintering behavior of the particles. This salt encapsulated metal powder was collected and washed with deionized water to remove the coating of sodium chloride. Dilute nitric acid was used to aid particle settling. This washing process introduced a thin oxide passivation layer onto the surface of the particle which was maintained as the particles were dried under vacuum. The resultant zirconium titanium alloy was then pressed to a density of 2.0 g/cm$^3$ and sintered for 30 min under vacuum at 500° C. Anodization was carried out at 25° C. using a voltage of 30V for 18 hours with a 0.1M electrolytic solution of ammonium pentaborate.

For the resulting anode, leakage current was determined after 2 minutes of applying a direct current voltage of 21V in a 10 wt. % phosphoric acid solution. Capacitance was also determined at a frequency of 100 Hz in the same phosphoric acid solution with a 2V bias.

The capacitance was 260 mFV/g with a leakage current of 7 nA/CV.

Example 2

A salt-encapsulated alloy powder having a mass ratio of Ti to Zr of 27:63 was manufactured by the flame synthesis process and washed as in Example 1 and was then pressed and sintered for 30 min at 500° C. as in Example 1. Anodization was carried out at 25° C. using a voltage of 10V for 12 hours with a 0.1M electrolytic solution of ammonium pentaborate.

For the resulting anode, leakage current was determined after 2 minutes of applying a direct current voltage of 7V in a 10 wt. % phosphoric acid solution. Capacitance was also determined at a frequency of 100 Hz in the same phosphoric acid solution with a 2V bias.

The capacitance was 140 mFV/g with a leakage current of 120 nA/CV.

Example 3

A salt-encapsulated alloy powder having a mass ratio of Ti to Zr of 15:85 was manufactured by the flame synthesis process with 2.5 wt. % nitrogen doping, as in Example 1 except for the reactant amounts and nitrogen doping. The nitrogen doping was achieved by introducing a small amount of nitrogen into the argon flow between the halides and concentric the sodium vapor flow. All nitrogen was determined to have reacted with the powder. The resultant powder was washed as in Example 1, and then pressed to 1.7 g/cm$^3$ and sintered for 30 min at 550° C. under vacuum. The XRD of this alloy is shown in FIGS. 4A and 4B. Anodization was carried out at 25° C. using of voltage of 30V for 6 hours with a 0.1M electrolytic solution of ammonium pentaborate.

For the resulting anode, leakage current was determined after 2 minutes of applying a direct current voltage of 21V in a 10 wt. % phosphoric acid solution. Capacitance was also determined at a frequency of 100 Hz in the same phosphoric acid solution with a 2V bias.

The capacitance was 200 mFV/g with a leakage of 340 nA/CV.

Example 4

A salt-encapsulated alloy powder having a mass ratio of Ti to Zr of 27:63 was manufactured by the flame synthesis process as in Example 1 and the product was split into 6 lots. A dilute solution of either nitric acid, hydrogen peroxide, sulfuric acid, phosphoric acid, ammonium pentaborate, or sodium acetate was used to remove the sodium chloride from the surface of the alloy powder. The resulting powders were then pressed and sintered for 30 min at 500° C. as in Example 1. Anodization was carried out at 25° C. using a voltage of 30V for 24 hrs with a 0.1M electrolytic solution of ammonium pentaborate.

For the resulting anodes, leakage current was determined after 2 minutes of applying a direct current voltage of 7V in a 10 wt. % phosphoric acid solution. Capacitance was also determined at a frequency of 100 Hz in the same phosphoric acid solution with a 2V bias.

The difference in average anode capacitance was not found to be statistically significant once a broken anode was excluded, but the leakage results are summarized in the table below:

| Solution | Leakage (nA/CV, standardized to the anodes washed in HNO3 solution) |
|---|---|
| Nitric acid (0.1M) | 1.0 |
| Hydrogen peroxide (3 wt. %) | 1.4 |
| Sulfuric acid (1.0M) | 0.46 |
| Phosphoric acid (0.1M) | 0.22 |
| Ammonium pentaborate (0.1M) | 0.81 |
| Sodium acetate (0.1M) | 0.34 |

Powder treated with an initial wash of phosphoric acid and then washed further with both DI water and nitric acid and then dried was found to have significant phosphor doping.

The present invention includes the following aspects/embodiments/features in any order and/or in any combination:

1. The present invention relates to a titanium-zirconium (Ti—Zr) alloy powder comprising an atomic ratio of Ti and Zr of from 10:90 to 90:10, and having an average primary particle size of from 550 nm to 2 microns.

2. The titanium-zirconium alloy powder of any preceding or following embodiment/feature/aspect, wherein said titanium-zirconium alloy powder further comprises a Ti—Zr oxide layer on said titanium-zirconium alloy powder.

3. The titanium-zirconium alloy powder of any preceding or following embodiment/feature/aspect, wherein said Ti—Zr oxide layer further comprises phosphorus.

4. The titanium-zirconium alloy powder of any preceding or following embodiment/feature/aspect, wherein said Ti—Zr oxide layer further comprises phosphorus at a level of from about 50 ppm to about 5,000 ppm.

5. The titanium-zirconium alloy powder of any preceding or following embodiment/feature/aspect, wherein said Ti—Zr oxide layer further comprises phosphorus at a level of from about 200 ppm to about 5,000 ppm.

6. The titanium-zirconium alloy powder of any preceding or following embodiment/feature/aspect, wherein said titanium-zirconium alloy powder further comprises a Ti—Zr oxide layer on said titanium-zirconium alloy powder and said Ti—Zr oxide layer has a thickness of from about 5 nm to about 20 nm.

7. The titanium-zirconium alloy powder of any preceding or following embodiment/feature/aspect, wherein said titanium-zirconium alloy powder further comprises a Ti—Zr oxide layer that fully encapsulates said titanium-zirconium alloy powder.

8. The titanium-zirconium alloy powder of any preceding or following embodiment/feature/aspect, wherein said titanium-zirconium alloy powder are particles consisting of a single phase homogeneous solid solution of Ti and Zr.

9. The titanium-zirconium alloy powder of any preceding or following embodiment/feature/aspect, wherein said titanium-zirconium alloy has less than 50 ppm carbon.

10. The titanium-zirconium alloy powder of any preceding or following embodiment/feature/aspect, wherein said titanium-zirconium alloy has less than 500 ppm of individual grains of titanium or zirconium or both.

11. The titanium-zirconium alloy powder of any preceding or following embodiment/feature/aspect, wherein said titanium-zirconium alloy powder has a D10 and D90 that is within 35% of the D50.

12. The titanium-zirconium alloy powder of any preceding or following embodiment/feature/aspect, wherein said titanium-zirconium alloy powder has a D10 and D90 that is within 25% of the D50.

13. The titanium-zirconium alloy powder of any preceding or following embodiment/feature/aspect, wherein said titanium-zirconium alloy powder has a D10 of from about 0.3 micron to about 10 microns, a D50 of from about 0.5 micron to about 400 microns, and a D90 of from about 1 micron to about 700 microns.

14. The titanium-zirconium alloy powder of any preceding or following embodiment/feature/aspect, wherein said titanium-zirconium alloy powder has an oxygen content of from about 0.1 wt % to about 5 wt %.

15. The titanium-zirconium alloy powder of any preceding or following embodiment/feature/aspect, wherein said titanium-zirconium alloy powder has a nitrogen content of from about 0.01 wt % to about 20 wt %.

16. The titanium-zirconium alloy powder of any preceding or following embodiment/feature/aspect, wherein said titanium-zirconium alloy powder has a BET surface area of from about 0.1 m$^2$/g to about 20 m$^2$/g.

17. The titanium-zirconium alloy powder of any preceding or following embodiment/feature/aspect, wherein said titanium-zirconium alloy powder, excluding any oxide layer present, is a non-metal oxide powder.

18. The titanium-zirconium alloy powder of any preceding or following embodiment/feature/aspect, wherein said titanium-zirconium alloy powder is a binary Ti—Zr alloy powder.

19. The titanium-zirconium alloy powder of any preceding or following embodiment/feature/aspect, wherein said titanium-zirconium alloy has less than 500 ppm of elements other than Ti, Zr, O, N, H, and P.

20. The titanium-zirconium alloy powder of any preceding or following embodiment/feature/aspect, wherein said titanium-zirconium alloy has less than 100 ppm of elements other than Ti, Zr, O, and P.

21. A sintered pellet comprising the titanium-zirconium alloy powder of any preceding or following embodiment/feature/aspect that is shaped in the form of a pellet and sintered.

22. A capacitor anode comprising said titanium-zirconium alloy powder of any preceding or following embodiment/feature/aspect, that is pressed and sintered.

23. An electrolytic capacitor comprising the capacitor anode of any preceding or following embodiment/feature/aspect.

24. A method of forming a capacitor anode comprising the Ti—Zr alloy of any preceding or following embodiment/feature/aspect, said method comprising forming said Ti—Zr alloy into the shape of an anode and sintering at a temperature of from about 400° C. to about 1200° C. for a time of at least 1 minute;
anodizing at from about 16 to about 200 volts;
annealing said anode at a temperature of from about 300 to about 350° C. for a time of from about 10 minutes to about 60 minutes; and
manganizing said anode.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A titanium-zirconium (Ti—Zr) alloy powder comprising an atomic ratio of Ti and Zr of from 10:90 to 90:10, and having a dendritic structure, an average primary particle size of from 550 nm to 2 microns and a BET surface area of from 1 $m^2/g$ to about 20 $m^2/g$.

2. The titanium-zirconium alloy powder of claim 1, wherein said titanium-zirconium alloy powder further comprises a Ti—Zr oxide layer on said titanium-zirconium alloy powder.

3. The titanium-zirconium alloy powder of claim 2, wherein said Ti—Zr oxide layer further comprises phosphorus.

4. The titanium-zirconium alloy powder of claim 2, wherein said Ti—Zr oxide layer further comprises phosphorus at a level of from about 50 ppm to about 5,000 ppm.

5. The titanium-zirconium alloy powder of claim 2, wherein said Ti—Zr oxide layer further comprises phosphorus at a level of from about 200 ppm to about 5,000 ppm.

6. The titanium-zirconium alloy powder of claim 1, wherein said titanium-zirconium alloy powder further comprises a Ti—Zr oxide layer on said titanium-zirconium alloy powder and said Ti—Zr oxide layer has a thickness of from about 5 nm to about 20 nm.

7. The titanium-zirconium alloy powder of claim 1, wherein said titanium-zirconium alloy powder further comprises a Ti—Zr oxide layer that fully encapsulates said titanium-zirconium alloy powder.

8. The titanium-zirconium alloy powder of claim 1, wherein said titanium-zirconium alloy powder are particles consisting of a single phase homogeneous solid solution of Ti and Zr.

9. The titanium-zirconium alloy powder of claim 1, wherein said titanium-zirconium alloy has less than 50 ppm carbon.

10. The titanium-zirconium alloy powder of claim 1, wherein said titanium-zirconium alloy has less than 500 ppm of individual grains of titanium or zirconium or both.

11. The titanium-zirconium alloy powder of claim 1, wherein said titanium-zirconium alloy powder has a D10 and D90 that is within 35% of the D50.

12. The titanium-zirconium alloy powder of claim 1, wherein said titanium-zirconium alloy powder has a D10 and D90 that is within 25% of the D50.

13. The titanium-zirconium alloy powder of claim 1, wherein said titanium-zirconium alloy powder has a D10 of from about 0.3 micron to about 10 microns, a D50 of from about 0.5 micron to about 400 microns, and a D90 of from about 1 micron to about 700 microns.

14. The titanium-zirconium alloy powder of claim 1, wherein said titanium-zirconium alloy powder has an oxygen content of from about 0.1 wt % to about 5 wt %.

15. The titanium-zirconium alloy powder of claim 1, wherein said titanium-zirconium alloy powder has a nitrogen content of from about 0.01 wt % to about 20 wt %.

16. The titanium-zirconium alloy powder of claim 1, wherein said titanium-zirconium alloy powder has a BET surface area of from 2 $m^2/g$ to about 20 $m^2/g$.

17. The titanium-zirconium alloy powder of claim 1, wherein said titanium-zirconium alloy powder is a binary Ti—Zr alloy powder.

18. The titanium-zirconium alloy powder of claim 1, wherein said titanium-zirconium alloy has less than 500 ppm of elements other than Ti, Zr, O, N, H, and P.

19. The titanium-zirconium alloy powder of claim 1, wherein said titanium-zirconium alloy has less than 100 ppm of elements other than Ti, Zr, O, and P.

20. The titanium-zirconium alloy powder of claim 1, wherein said BET surface area is from 3 $m^2/g$ to about 10 $m^2/g$.

21. The titanium-zirconium alloy powder of claim 1, wherein said titanium-zirconium alloy powder has a fractal dimension of from about 2.0 to 2.95.

22. The titanium-zirconium alloy powder of claim 21, wherein said titanium-zirconium alloy powder has a mesh size (US) of from −400 to −40 and a Scott density of from 6 g/in$^3$ to 30 g/in$^3$.

23. The titanium-zirconium alloy powder of claim 21, wherein said titanium-zirconium alloy powder has a mesh size (US) of from −400 to −40 and a Scott density of from 6 g/in$^3$ to 13 g/in$^3$.

24. The titanium-zirconium alloy powder of claim 1, wherein said titanium-zirconium alloy powder has a fractal dimension of from 2 to 2.2.

25. A sintered pellet comprising the titanium-zirconium alloy powder of claim 1 that is shaped in the form of a pellet and sintered.

26. A capacitor anode comprising said titanium-zirconium alloy powder of claim 1, that is pressed and sintered.

27. An electrolytic capacitor comprising the capacitor anode of claim 26.

28. A method of forming a capacitor anode comprising the Ti—Zr alloy of claim 1, said method comprising forming said Ti—Zr alloy into the shape of an anode and sintering at a temperature of from about 400° C. to about 1200° C. for a time of at least 1 minute;
   anodizing at from about 16 to about 200 volts;
   annealing said anode at a temperature of from about 300 to about 350° C. for a time of from about 10 minutes to about 60 minutes; and
   manganizing said anode.

* * * * *